United States Patent [19]

Seiler

[11] 4,421,346

[45] Dec. 20, 1983

[54] TUBE CONNECTOR

[76] Inventor: Alfred J. Seiler, 1700 Dumas-Vemont, Ville-de-Laval, Quebec, Canada

[21] Appl. No.: 232,211

[22] Filed: Feb. 6, 1981

[30] Foreign Application Priority Data

Feb. 7, 1980 [CA] Canada ............................. 345354

[51] Int. Cl.³ .................. F16L 21/04; F16L 55/00; F16L 5/00; F16L 19/00
[52] U.S. Cl. ................................ 285/346; 285/23; 285/158; 285/348; 285/369
[58] Field of Search ............ 285/158, 346, 323, 341, 285/342, 343, 348, 23, 369

[56] References Cited

U.S. PATENT DOCUMENTS

| 494,918 | 4/1893 | Evans | 285/346 X |
|---|---|---|---|
| 2,145,702 | 1/1939 | Wilcox | 285/346 X |
| 2,157,008 | 5/1939 | Owen | 285/341 X |
| 2,738,991 | 3/1956 | Rieser | 285/346 |
| 3,738,688 | 6/1973 | Racine | 285/346 X |
| 4,043,576 | 8/1977 | Reich et al. | 285/341 X |

FOREIGN PATENT DOCUMENTS 249671 5/1925 Canada .
564045 9/1958 Canada .
661796 4/1963 Canada .

Primary Examiner—Richard J. Scanlan, Jr.
Attorney, Agent, or Firm—Alan Swabey; Robert Mitchell; Guy Houle

[57] ABSTRACT

The present invention relates to means for interconnecting a tube or the like to a further member. It further relates to such means wherein it is also desired to provide a sealed interconnection between the tube or the like and the further member. It particularly relates to interconnecting a tube or the like to a wall member and equally relates to interconnecting a pair of tube members together in axial alignment. The cross-section of the aforementioned tubes may, for example, be round or rectangular.

20 Claims, 7 Drawing Figures

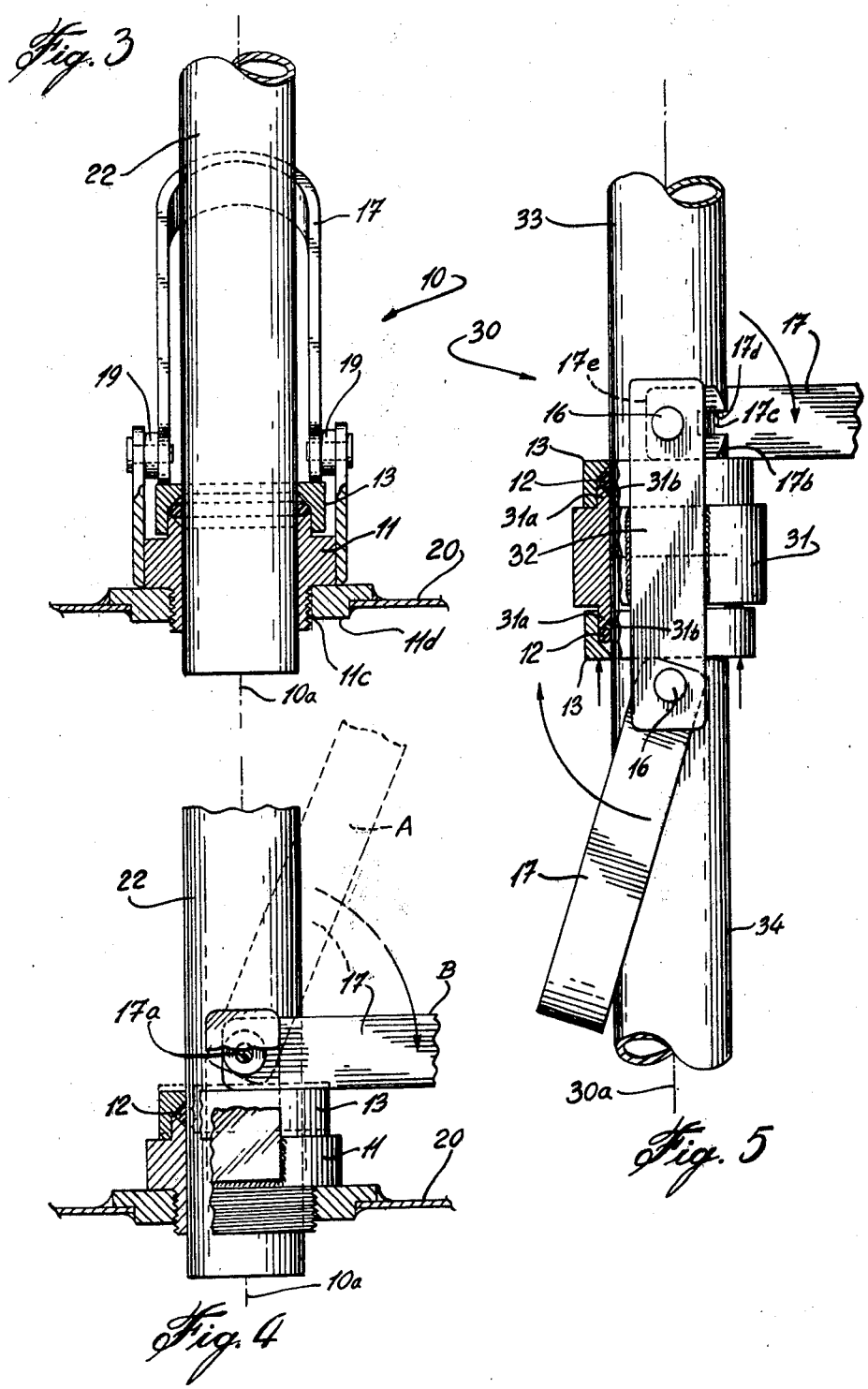

TUBE CONNECTOR

BACKGROUND OF THE INVENTION

(a) Field of the Invention

The present invention relates to means for interconnecting a tube or the like to a further member. It further relates to such means wherein it is also desired to provide a sealed interconnection between the tube or the like and the further member. It particularly relates to interconnecting a tube or the like to a wall member and equally relates to interconnecting a pair of tube members together in axial alignment. The cross-section of the aforementioned tubes may, for example, be round or rectangular.

Various means including ones referred to as adaptors, for interconnecting tubes or the like to wall members and other tubes are known. These include for example ones manufactured and sold by RNG Equipment under the Trademark EVER-TITE*.

One major drawback with the latter and other known devices in the prior art is their high cost, especially with regard to certain applications. A second major drawback is their complicated design.

SUMMARY OF THE INVENTION

It is therefore a prime object of the present invention to provide an improved means for interconnecting a tube or the like to a further member, including to another tube or the like, which is relatively inexpensive to produce and which is simple in design.

It is a further object of the present invention to provide a means as discussed above which is simple to operate requiring minimum skill and which requires a minimum of maintenance.

In one aspect of the present invention there is provided, means for interconnecting a tube or the like to a further member.

In a further aspect of the present invention there is provided, a means for interconnecting a tube or the like to a further member wherein said means, having a central longitudinal axis, comprises in combination: a first annular member having a seal accommodating face thereon; a seal abutting said face; a second annular member having a seal accommodating face thereon abutting said seal; and means for clamping said first and second annular members together to thereby compress said seal between said seal accommodating faces and displace said seal in a direction toward said central longitudinal axis.

In a further aspect of the present invention there is provided, a means for interconnecting a tube or the like to a further tube or the like wherein the central longitudinal axis of the respective tubes are aligned substantially coincident with one another to provide a one length piece of tubing, said means comprising: a first annular member having a pair of seal accommodating faces thereon, said seal faces being arranged on the opposite end faces of said member; a pair of seals, each seal abutting respectively said seal accommodating face of said first annular member; second and third annular members, each having a seal accommodating faces thereon abutting said respective seals; and means for clamping said second and third annular members to said first annular member to sandwich the same therebetween, to thereby compress said respective seals between said respective seal accommodating faces and displace said seals in a direction toward said central longitudinal axis.

BRIEF DESCRIPTION OF THE DRAWINGS

The invention is illustrated by way of example in the accompanying drawings wherein:

FIG. 3 is a part cross-sectional view of the means shown in FIG. 1 including a tube therein, prior to securing the tube indirectly to the end wall member of the drum.

FIG. 4 is a part cross-sectional view of the means shown in FIG. 3 subsequent to securing the tube indirectly to the end wall member of the drum.

FIG. 5 illustrates a means in accordance with the present invention for interconnecting a pair of tubes together to provide a positive and leakproof joint therebetween.

DETAILED DESCRIPTION OF THE DRAWINGS

Figure 2:
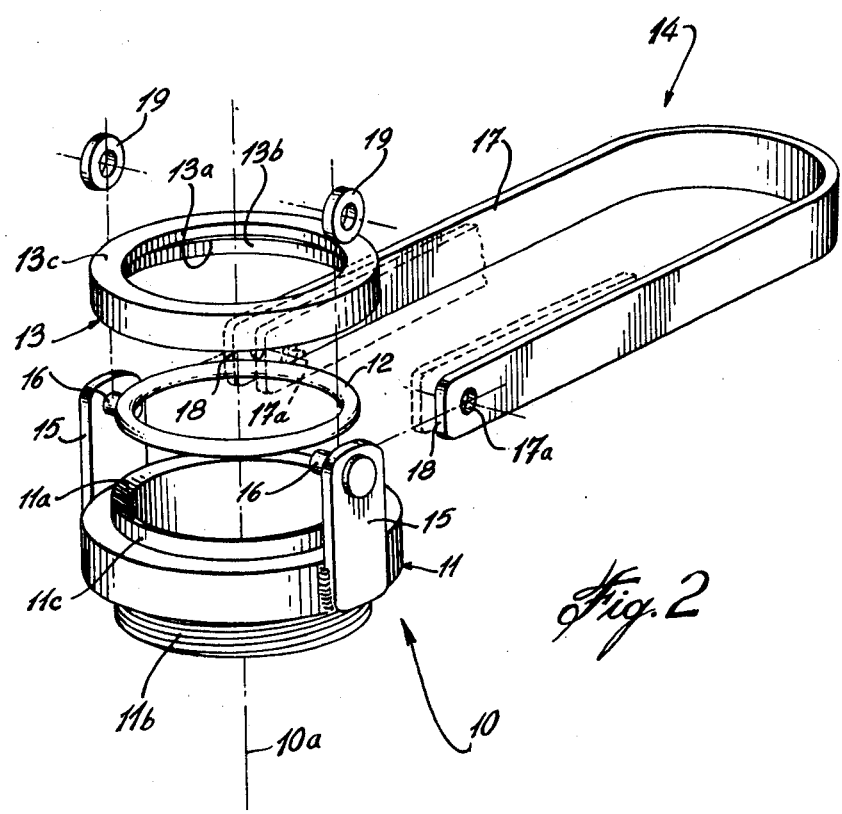
FIG. 2 illustrates, in exploded view, a means as shown in FIG. 1.

Referring now in detail to the drawings. FIG. 2 illustrates a means 10, having a central longitudinal axis 10a, for use in interconnecting a tube or the like to a further member and comprises in combination, a first annular member 11 having a seal accommodating face 11a thereon; a seal 12 adapted to abut face 11a; a second annular member 13 having a seal accommodating face 13a thereon adapted to abut seal 12 and means 14 for use in clamping annular members 11 and 13 together to thereby compress seal 12 between the respective seal accommodating faces 11a and 13a and displace seal 12 in a direction toward central longitudinal axis 10a.

As readily seen in FIG. 2, means 14 for use in in clamping annular members 11 and 13 together comprises spaced lugs 15 rigidly secured to and extending from annular member 11, lugs 15 having pivots 16 projecting outwardly therefrom toward central longitudinal axis 10a. Handle 17 has a "U"-shaped configuration and includes apertures 17a adjacent the terminal ends thereof for mounting upon respective pivots 16. Handle 17 further includes bearing faces 18 for engaging annular member 13 in an assembled condition as best seen in Figure. Referring to FIG. 4, it will be seen apertures 17a are arranged in handle 17 such that during the pivoting of handle 17 about the pivots 16 from a first position A to a second position B bearing faces 18 extend away from pivots 16 causing handle 17 to urge annular member 13 toward annular member 11, to thereby compress and displace seal 12.

In the embodiment as shown in FIG. 2, a pair of spaces 19 are provided and mount on pivots 16 intermediate respective lug 15 and handle 17. This is to ensure bearing faces 18 are located adjacent the peripheral edges of annular member 13 since its outer diameter is spaced from lugs 15 to facilitate assembly and disassembly of annular member 13 to annular member 11.

All components comprising means 10 except of course seal 12, may be made from suitable materials such as steel. Referring again to FIG. 2, seal accommodating faces 11a and 13a are similar and comprise a chamfered surface providing point contact with the seal 12 being an "O" ring. Annular member 11 also includes a threaded portion 11b for use in securing to a female thread 11c in boss 11d rigidly secured to wall member 20 by welding as shown in FIG. 3.

Annular member 11 includes a spigot 11e adapted to engage snuggly the inner annular wall 13b of annular member 13 thus providing axial alignment of annular members 11 and 13. Annular member 13 is provided with a flat bearing surface 13c for use in conjunction with bearing surface 18 of handle 17.

In assembling means 10 together, seal 12 is first placed in position abutting seal accommodating face 11a, annular member 13 is then slid under pivots 16 to drop onto spigot 11e and have seal accommodating surface 13a abut seal 12. Spacers 19 are then placed on pivots 14 and handle 17 mounted upon pivots 16 to provide a captive assembly. Handle 17 is applied in position on pivots 16 by "springing" its terminal ends inwardly. Once on pivots 16, no further securing of handle 17 is required. Disassembly of means 10 is carried out by reversing the steps of assembly.

Figure 1:
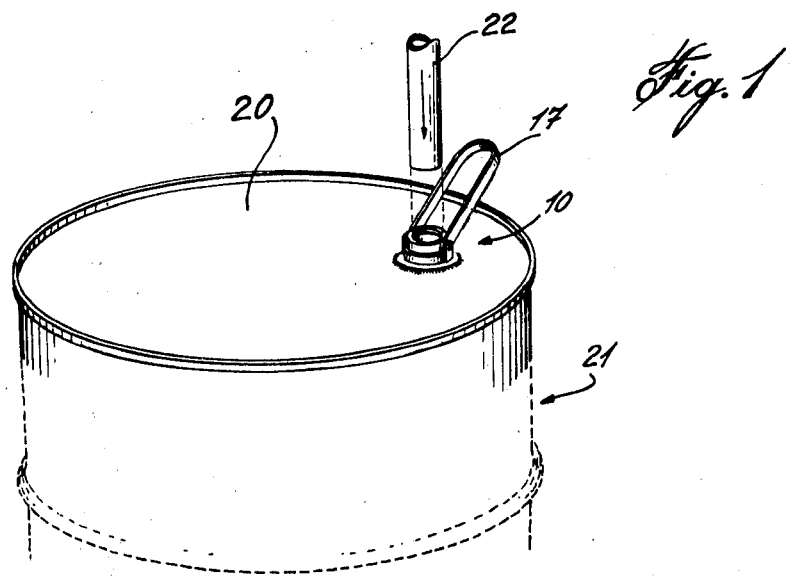
FIG. 1 illustrates a means in accordance with the present invention, secured to the end wall member of a drum and a tube about to be inserted and secured within the means thereby to be clamped in position within the end wall member and provide a sealed connection between the end wall member and the tube.

Referring to FIG. 1, it will be seen means 10 is secured to the end wall 20 of a drum 21 and a tube 22 is about to be inserted into means 10 for positive and leakproof connection thereto. Prior to entry of tube 22 into means 10, handle 17 is in the up position namely position A as shown in FIG. 4. In this situation, seal 12 is not unduly compressed. Following insertion of tube 22 into means 10, handle 17 is moved to position B, and in doing so squeezes seal 12 against the outer surface of tube 22 thereby positively gripping tube 22 to provide a leakproof connection between tube 22 and wall member 20. Accordingly, the movement of handle 17 to position B compresses seal 12 due to the arrangement of the chamfered seal accommodating faces 11a and 13a, as best seen in FIG. 4, seal 12 is displaced toward central longitudinal axis 10a thus to squeeze against tube 22. From the foregoing, it will thus be realized means 10 provides for equally easy removal of tube 22 from wall member 20, enhanced by the over center clamping action of means 10.

Tube 22 may be of any suitable material, including plastic.

The arrangement shown in FIG. 4 is particularly useful where quick connect and quick disconnection of pipes to containers is required.

Reference is now made to FIG. 5 which comprises a means 30 namely an assembly of components similar to those comprising means 10, including fabrication and materials. This assembly as indicated above, is a means for interconnecting a pair of tubes together to provide a positive and leakproof joint therebetween.

Means 30 comprises a first annular member 31 having a pair of end portions 31a including end faces thereon, which further include seal accommodating surfaces 31b. End portions 31a are in fact identical to the end portion of annular member 11 with seal accommodating face 11a. Annular member 31 may if desired, for example, be constructed from two annular members 11 arranged in back-to-back fashion with a pipe coupling interconnecting the respective threaded portions 11b. Thus, the design of this embodiment is flexible and permits a minimum of parts to be produced for the two applications disclosed in FIGS. 4 and 5.

As readily seen in FIG. 5, means 30 includes a pair of seals 12 and second and third annular members, each of which may be similar to annular member 13, as indicated in FIG. 5.

The handles of means 30 also may be similar to handle 17, as indicated and discussed in detail previously which are shown secured to pivots 16 secured to a pair of elongated lugs 32, in turn secured by welding to annular member 31.

Although, as shown in FIG. 5, handles 17 swing on alternative sides of the central longitudinal axis 30a, handles 17 may, if desired, be arranged to swing on a common side of the arrangement. Although not shown in FIG. 5, four spacers 19 are located on respective pivots 16 intermediate handle 17 and the respective elongated lugs 32 which are located on opposite sides of annular member 31.

Attention is again drawn to FIG. 5, in particular, the upper one of the handles 17 showing a modification thereto. In order to make provision for handle 17 being a detachable handle, when for example, means 30 is operated to positively secure tubes 33 and 34 together, handle 17 is severed along line 17b (two places) to thereby provide a "U"-shaped handle having a pair of extending tongue portions 17c which are adapted to be readily inserted into socket portions 17d of the parts 17e. Thus, portions 17e previously the free ends of handle 17, remain in place when the modified handle is removed. It will be readily appreciated the aforementioned handle modification may be applied to both the lower one of the handles 17 in FIG. 5 and the ones shown in FIG. 4.

Thus, apart from making means 10 and 30 less prone to being tampered with when in operation holding tubes 33 and 34 together or when for example, locking tube 22 in position as seen in FIGS. 3 and 4, such modification results in a reduction in the number of handles required in a given arrangement. The modified handle thus represents a form of key for use in rotating portions 17e.

Means 30 is assembled, disassembled and operated in similar fashion to means 10. FIG. 5 shows tube 33 in position ready for clamping by handle 17. Tube 34 is shown clamped in position. Referring to FIG. 5 when tube 33 is clamped in position, there is provided a pair of tube members interconnected one to another having a leakproof joint therebetween. Again, means 30, like means 10, provides for rapid connecting and disconnecting of a tube or the like to a further member.

Figure 6:
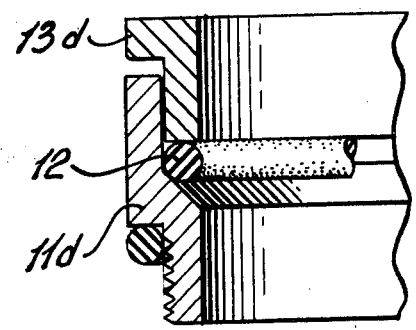
FIG. 6 is a part cross-sectional view of an alternative portion of the means shown in FIG. 4, showing in particular an alternative "O" ring seating arrangement.

FIG. 6, as indicated above provides an alternative "O" ring seating arrangement to that shown in for example FIG. 4. Annular members 11d and 13d correspond to annular members 11 and 13 shown in FIG. 4 and perform the similar function of compressing seal 12 when clamped together by handle 17. However, the embodiment of FIG. 6 provides for a greater displacement of seal 12 and therefore increased pressure of seal 12 against tube 22.

Figure 7:
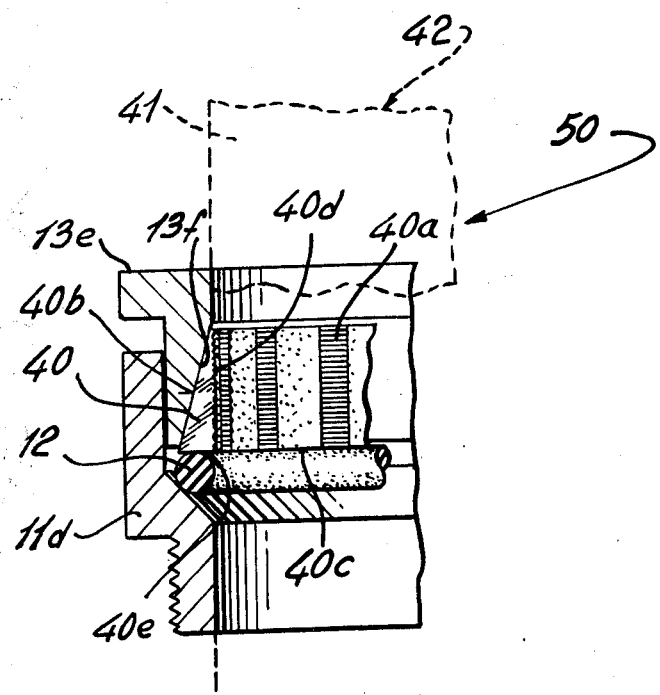
FIG. 7 is a part cross-sectional view of a further means in accordance with the present invention, being an alternative to that shown in FIGS. 4 and 5 for use in securing respective tube members to a further member.

Reference is now made to FIG. 7 which, as mentioned above illustrates a further means, in accordance with the present invention for interconnecting tubes one to another or a tube to a further type of member, in similar fashion to that shown respectively in FIGS. 5 and 4, but wherein the tubes are of steel or the like material. Also, wherein a higher pressure joint is desired to that provided by the aforementioned embodiments in connecting the tubes one to another or a tube to a further type of member, for example as shown in FIG. 4.

Referring to FIG. 7, there is seen a connecting means 50 comprising an annular member 13e being similar to member 13d except having a tapered annular inner face 13f engageable with an annular wedge shaped member 40. Annular wedge shaped member 40 basically comprises an annular ring 40a of resilient material having an outer conical tapered face 40b. Member 40 further includes a plurality of metal portions 40c imbedded in ring 40a, and as readily seen in FIG. 7, arranged equi-spaced around ring 40a.

As seen, portions 40c include a serrated tooth like face 40d for positively engaging and gripping the outer face 41 of tube 42 when compressed thereagainst by member 13e, when clamped in position by for example, handle 17 or portion 17e.

As further seen, member 40, like member 13d, includes a non-inclined face 40e for use in compressing seal 12. Seal 12 is accommodated in similar fashion to that seen in FIG. 6 by annular member 11d.

Thus it will be readily seen, as member 13e is forced towards seal 12 by handle 17, the wedging action of member 13e forces wedge shaped member 40 towards seal 12 to compress the same and at the same time causes the metal parts 40c to bite into tube 42 and positively prevent relative movement between means 50 and tube 42.

From the foregoing, it will thus be readily appreciated means 50, utilizing a collet action provides an alternative sealed tube connecting means to that shown in FIGS. 4 and 5 wherein the tubing material is, for example, steel, rather than for example, plastic. Also, wherein a higher pressure type seal is required to that provided by "O" ring seal 12, in respect of FIGS. 3, 4 or 5.

I claim:

1. A connector means for use in interconnecting a tube or the like to a further member, said connector means having a central longitudinal axis extending and defining a path therethrough and comprising in combination:
   (a) a first annular member having a first seal accommodating face thereon said face being inclined so as to face toward said central longitudinal axis;
   (b) an "O" ring or the like seal, abutting said face;
   (c) a second annular member having a second seal accommodating face thereon for abutting said seal, said second seal accommodating face being inclined toward said central longitudinal axis; and
   (d) clamping means having an overcenter type clamping action for clamping said first and second annular member together to thereby compress said seal between said seal accommodating faces and in view of their inclinations, displace said seal in a direction radially inwardly of said annular members toward said central longitudinal axis, said clamping means having a handle with a pair of terminal ends, said terminal ends having a bearing face directly engaging said second annular member for use in providing said clamping action.

2. A connector means as defined in claim 1 wherein said seal and seal accommodating faces are circular.

3. A connector means as defined in claim 1 wherein said clamping means for clamping said first and second annular members together comprises spaced lugs rigidly secured to and extending from said first annular member in a direction in common with said central longitudinal axis, each of said lugs having a pivot projecting outwardly therefrom in a direction toward said central longitudinal axis and said handle having in said terminal ends an aperture, for mounting on said pivots, said apertures being arranged in said handle such that during pivoting of said handle about said pivots from a first position to a second position said bearing faces extend away from said pivots causing said handle to urge said second annular member toward said first annular member to thereby compress and displace said seal.

4. A connector means as defined in claim 1 or 2 wherein said second annular member comprises first and second portions, said first portion having a conical-like outer shape for matingly engaging a tapered bore in said second portion, said first portion also including said seal accommodating face of said second annular member thereon, and having a bore adapted to slidably engage the outer surface of said tube when inserted therein, the surface of said bore of said first portion including spaced metal portions and spaced resilient material portions located intermediate said metal portions allowing said metal portions to be displaced independently of one another, said metal portions further having a roughened surface for use in gripping said tube, when said means for clamping is operated to compress said first and second portions together imparting a wedging action to move said metal portions toward said tube while at the same time compressing said seal between said accommodating faces, thereby positively securing said tube to prevent movement of the same relative to said second annular member.

5. A connector means as defined in claim 2 wherein said clamping means for clamping said first and second annular members together comprises spaced lugs rigidly secured to and extending from said first annular member in a direction in common with said central longitudinal axis, each of said lugs having a pivot projecting outwardly therefrom in a direction toward said central longitudinal axis and said handle having in said terminal ends an aperture for mounting-on said pivots, said apertures being arranged in said handle such that during pivoting of said handle about said pivots from a first position to a second position, said bearing faces extend away from said pivots causing said handle to urge said second annular member to thereby compress and displace said seal.

6. A connector means as defined in claim 3 wherein said first annular member includes means thereon for securing the same to said further member.

7. A connector means as defined in claim 5 wherein said first annular member includes means thereon for securing the same to said further member.

8. A connector means as defined in claim 6 wherein said means on said first annular member for securing to said further member comprises a screw thread.

9. A connector means as defined in claim 7 wherein said means on said first annular member for securing to said further member comprises a screw thread.

10. A connector means as defined in claim 3, 5 or 6 wherein said handle has a "U"-shaped configuration and is detachably secured to said pivots.

11. A connector means as defined in claim 3, 5 or 6 wherein said handle includes a "U"-shaped portion, the free ends of which include respectively extending tongue portions slidably engaging mating sockets in the further portions of the handle having said apertures therein, thereby to provide a partially removable handle.

12. A connector means as defined in claim 3, 5 or 6 wherein said handle includes a "U"-shaped portion, the free ends of which include means for detachably connecting the same to the further portions of the handle having said apertures therein thereby to provide a partially removable handle.

13. A connector means as defined in claim 7, 8 or 9 wherein said handle has a "U"-shaped configuration and is detachably secured to said pivots.

14. A connector means for use in interconnecting a tube or the like to a further tube or the like wherein the central longitudinal axis of the respective tubes are aligned substantially coincident with one another to provide substantially a one length piece of tubing, said means comprising:
   (a) a first annular member having a pair of seal accommodating faces thereon, said seal accommodating faces being arranged on opposite end faces of said member and the respective seal accommodating faces being inclined so as to face toward said central longitudinal axis;
   (b) a pair of "O" rings or the like seals, each seal abutting respectively said accommodating face of said first annular member;
   (c) second and third annular members each having seal accommodating faces thereon for abutting respective ones of said seals, said seal accommodating faces of said second and third annular members being inclined so as to face toward said central longitudinal axis; and
   (d) clamping means having an overcenter type clamping action for clamping said second and third annular members relative to said first annular member to sandwich said first annular member therebetween to thereby compress said seals between said respective ones of said seal accommodating faces and in view of their inclinations, displace said seals radially inwardly of said annular members in a direction toward said central longitudinal axis.

15. A connector means as defined in claim 14 wherein said seals and seal accommodating faces are circular.

16. A connector means as defined in claim 14 wherein said means for clamping said second and third annular members to said first annular member comprises spaced lugs rigidly secured to said first annular member and extending away therefrom in a direction in common with said central longitudinal axis, said lugs accordingly extending in a direction away from said respective end faces, each of said lugs having a pivot projecting outwardly therefrom in a direction toward said central longitudinal axis and a pair of handles each having a pair of terminal ends including apertures therein for mounting on said respective pivots, said terminal ends of said respective handles also having bearing faces for engaging respectively said second and third annular members, said apertures being arranged in said handles adjacent the terminal ends thereof such that during pivoting of said respective handles from a first position to a second position, said respective bearing faces extend away from said respective pivots causing said handles to urge said second and third annular members toward said first annular member thereby to compress and displace said seal.

17. A connector means as defined in claim 14 wherein said second and third annular members each comprise a first and a second portion, said first portion having a conical-like outer shape for matingly engaging a tapered bore in said second portion, said first portion also including said seal accommodating face of said respective second or third annular member thereon, and having a bore adapted to slidably engage the outer surface of said tube when inserted therein, the surface of said bore of said first portion including spaced metal portions and spaced resilient material portions located intermediate said metal portions, allowing said metal portions to be displaced independently of one another, said metal portions further having a roughened surface for use in gripping said tube.

18. A connector means as defined in claim 15 wherein said means for clamping said second and third annular members to said first annular member comprises spaced lugs rigidly secured to said first annular member and extending away therefrom in a direction in common with said central longitudinal axis, said lugs accordingly extending in a direction away from said respective end faces, each of said lugs having a pivot projecting outwardly therefrom in a direction toward said central longitudinal axis and a pair of handles each having a pair of terminal ends including apertures therein for mounting on said respective pivots, said terminal ends of said respective handles also having bearing faces for engaging respectively said second and third annular members, said apertures being arranged in said handles adjacent the terminal ends thereof such that during pivoting of said respective handles from a first position to a second position, said respective bearing faces extend away from said respective pivots causing said handles to urge said second and third annular members toward said first annular member thereby to compress and displace said seal.

19. A connector means as defined in claim 16 or 18 wherein each of said handles has a "U"-shaped configuration, the free ends of the "U" comprising said terminal ends, said handle being further adapted such that said terminal ends are readily movable relative to one another to permit said handle to be readily attached or detached from the pivots mounting the same.

20. A connector means as defined in claim 16 or 17 wherein each of said handles includes a "U"-shaped portion, the free ends of which include respectively extending tongue portions slidably engaging mating sockets in the further portions of the handle having said apertures therein, thereby to provide a partially removable handle.

* * * * *